Dec. 21, 1937.  J. GOODMAN  2,103,112
REFUSE TRUCK
Original Filed Feb. 6, 1931   2 Sheets-Sheet 1

INVENTOR
Joseph Goodman
BY
Zoltan Polachek
ATTORNEY

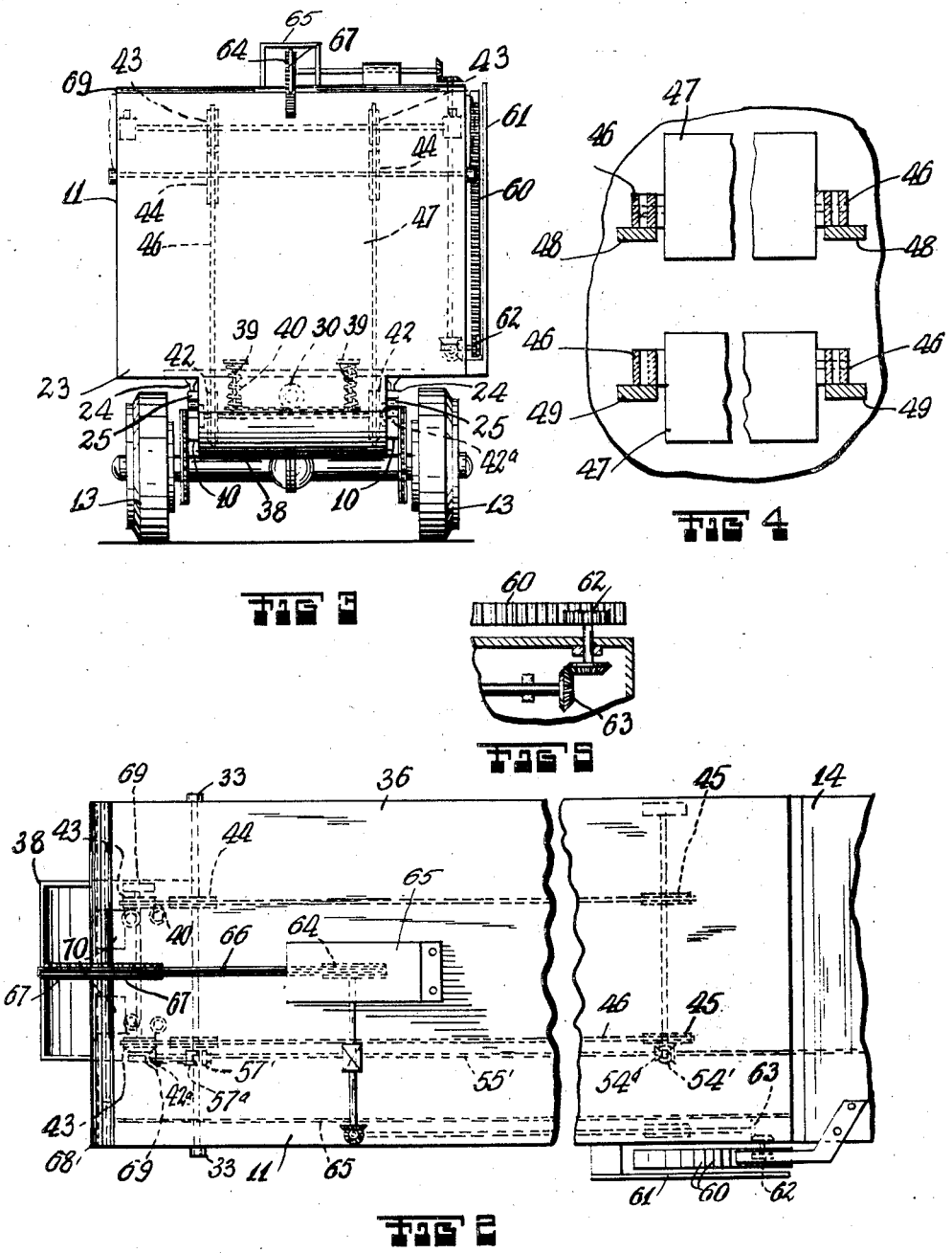

Patented Dec. 21, 1937

2,103,112

UNITED STATES PATENT OFFICE 2,103,112

REFUSE TRUCK

Joseph Goodman, New York, N. Y., assignor to Automatic Truck Loader Corporation, New York, N. Y., a corporation of Delaware Refiled for abandoned application Serial No. 513,860, February 6, 1931. This application July 31, 1937, Serial No. 156,734

5 Claims. (Cl. 214—67)

REISSUED

This invention relates to new and useful improvements in a refuse truck.

This application is a refile of my abandoned application, filed on February 6, 1931, Serial Number 513,860.

The invention has for an object the provision of a refuse truck which is characterized by a truck body for holding refuse, and a loading conveyor extending across the top and down the rear of the truck body.

The invention has for a further object to arrange the truck body for tilting upwards so as to be capable of dumping and to provide a rear door upon the truck body, and means for automatically moving the conveyor section upon the rear of the body away to allow the door to open during dumping.

A still further object of this invention is to provide means to drive the conveyor in the down position of the truck body.

As a further object of this invention it is proposed to provide an arcuate stationary rack mounted upon the driver's cabin of the refuse truck, which in turn is mounted upon its chassis, and a gear in mesh with said arcuate rack and connected for transmitting motions upon upward tilting of the truck body to cause the rear section of the conveyor to be moved as above recited.

A still further object of this invention is to arrange the conveyor into two sections, namely a stationary top section and a rear section which is hinged on the top section so as to be capable of swinging away from the rear of the truck body.

A still further object of this invention is to arrange a shaft to constitute the pintle pin for the pivotal mounting of the rear section of the conveyor, to fix a sprocket upon this shaft, and to connect the sprocket with a transmission system to the gear before mentioned which is in mesh with the arcuate stationary rack.

And this invention has for a still further object the provision of a refuse truck of the class mentioned which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims, in which the various novel features of the invention are more particularly set forth.

In the accompanying drawings forming a material part of this disclosure:—

Fig. 2 is a fragmentary plan view of Fig. 1.

Fig. 3 is a rear elevational view of Fig. 1.

Fig. 4 is a fragmentary vertical sectional view taken on the line 4—4 of Fig. 1.

Fig. 5 is a fragmentary sectional view taken on the line 5—5 of Fig. 1.

Figure 1:
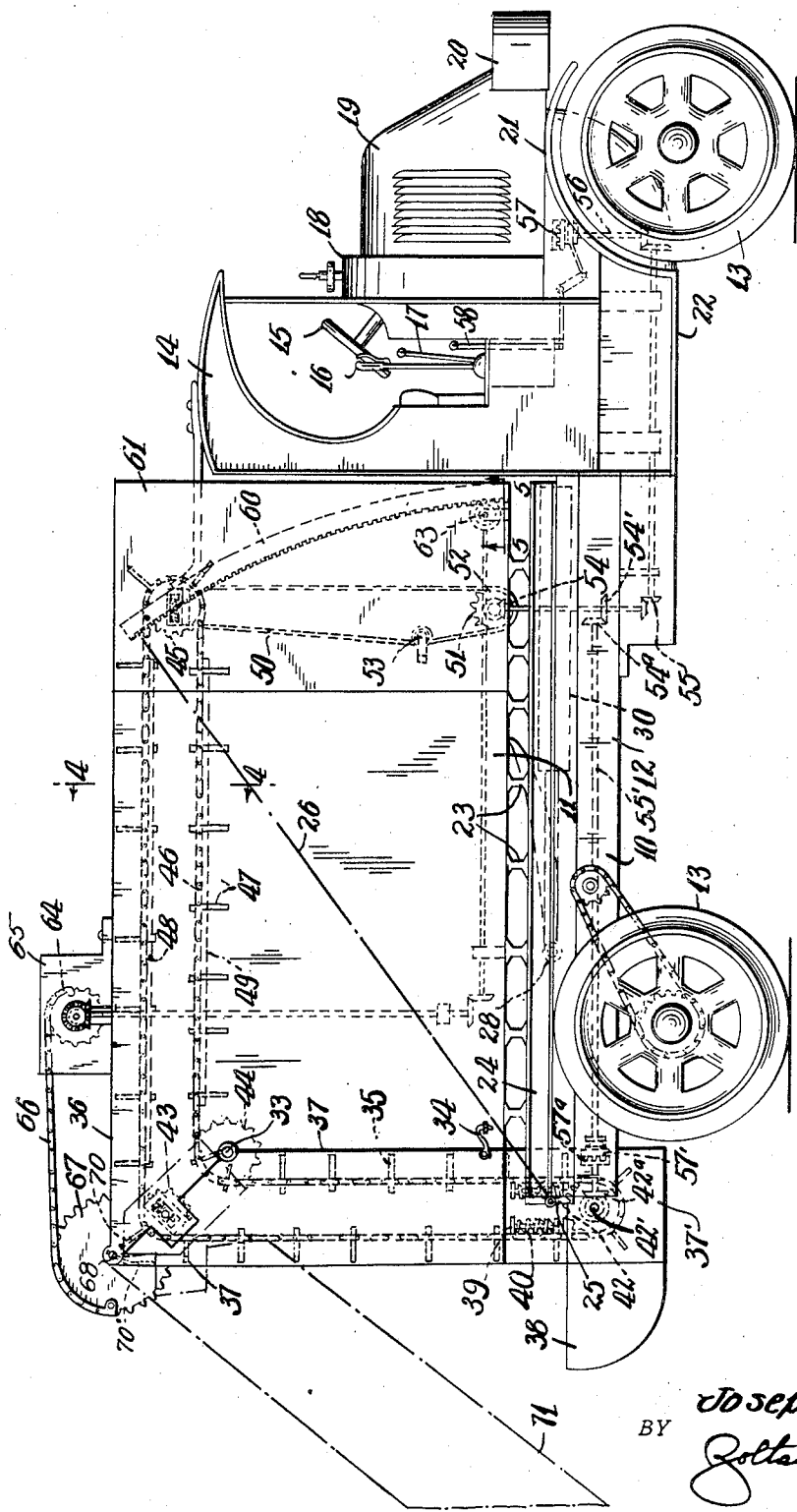
Fig. 1 is a side elevational view of a motor truck constructed according to this invention.

The refuse truck according to this invention consists of a truck 10 with a truck body 11. The details of the truck 10 are not shown nor will they be described fully, since they form no part of this invention. To help persons skilled in the art to recognize the truck, various familiar parts will be reviewed. The truck 10 is shown with a chassis 12 supported by wheels 13. It is also provided with a driver's cabin 14 in which there is a steering wheel 15, a hand brake 16, and a shift 17. To the front of the driver's cabin, a radiator 18 is shown and to the front of this the conventional hood 19 which houses the motor of the vehicle. Numeral 20 indicates the front bumper while 21 indicates the front fender which is connected with the running board 22. While just several parts of the truck have been mentioned, it should be borne in mind that this truck must be fully equipped as is conventional for its operation.

A means is provided for tilting the body 11 to dump from the rear. This means is not shown in great detail, since it also forms no part of this invention and is generally known to those skilled in the art. It is sufficient to state that the body 11 is mounted upon transverse beams 23 which in turn are supported upon longitudinal beams 24. The longitudinal beams are hinged at 25 upon the chassis 12 of the truck. This allows the body to tilt upwards to a position for example as illustrated by the dot and dash lines 26. A transmission system 30, not shown in detail on the drawings, controllable and operable from the motor of the vehicle as is conventional may serve to tilt the body to position 26.

A member 37 for closing the rear of the truck body 11 is hingedly mounted at its top 33 upon the truck body. Catches 34 serve to normally hold the member 37 closed. A loading conveyor 35 extends across the top and the rear side of the body 11. This conveyor is arranged within a casing formed with a top section 36 which is fixed upon the top of the truck body 11 and a rear section 37 which is hingedly connected with the top section 36.

The rear section 37 is provided with an in-take spout 38 through which the refuse may be fed. The lower section 37' of the casing is detached and separate from the upper section and resiliently connected so as to prevent jamming of the conveyor 35. Studs 39 project from the section portion 37' through apertures in flanges in the upper portion, and coaxial springs 40 act between the flanges of the upper section and heads 41 on the studs 39 to accomplish the resilient supporting of the section 37'.

The conveyor 35 consists of bottom sprockets 42 rotatively mounted in blocks resiliently supported in the sides of the casing section 37. Top sprockets 43 are resiliently supported in blocks mounted upon the sides of the stationary casing section 36. Intermediate sprockets 44 are rotatively supported upon the casing section 36, and front sprockets 45 are rotatively mounted in blocks resiliently supported at the front of the casing section 36.

An endless chain 45 extends over the sprockets 42, 43 and 45 and against the sprocket 44 in an endless fashion as shown in Fig. 1. From the chains there projects a plurality of conveying blades or buckets 47 which are capable of lifting and carrying refuse from the bottom of the casing section 37' up across the top of the body 11 of the truck. The spaces between the blades 47 are opened and the blades themselves are depended upon to do the conveying. The chains 46 are supported upon guides 48 and 49 within the sides of the casing section 36, as clearly shown in Fig. 4. This prevents sagging of the chains which would interfere with their efficient operation.

A means is provided for driving the conveyor and comprises a driver gear fixed upon the shaft which supports the sprockets 45. A chain 50 engages over this driver gear and over another gear 51 which is upon a shaft having a bevel gear 52 projecting slightly through the bottom of the truck body 11. An idler 53 is resiliently mounted and serves to keep the chain 50 in tension. A bevel gear 54 is fixed upon a vertical shaft and connects with a transmission system 55 which terminates in a rod 56 which connects up with the motor of the vehicle. A clutch 57 is interposed in the rod 56 and is controlled by a hand lever 58 within the driver's cabin. When so desired, the clutch 57 may be engaged for causing rotations of the bevel 54, which in turn will rotate the bevel 52 and the conveyor 35. It should be noticed that the truck body 11 may tilt upwards to the position indicated by the dot and dash lines 26 freely, since in such event the bevel gear 52 merely disengages from the bevel 54.

Another means is also provided for driving the conveyor, consisting of a bevel gear 54' connected with the transmission system 55. Bevel gear 54' meshes with a bevel gear 54ᵃ fixed on one end of a horizontal shaft 55'. On the other end of shaft 55' a clutch member 57' is adapted to mesh with a corresponding clutch member 57ᵃ which drives axle 42' of sprocket 42 through bevel gears 42ᵃ.

Either one or the other driving means for driving the conveyor may be used alone, if so desired.

A means is also provided for automatically moving the conveyor sections 37 away from the rear of the truck body upon tilting of the body to allow the dumping. This means comprises an arcuate rack 60 having a center of curvature corresponding with the pivot 25 and stationarily mounted in that it is bolted upon the driver's cabin 14. A cover plate 61 serves to cover the arcuate rack 60 so that it is not exposed to view. A pinion 62 meshes with the rack 60 and connects with a transmission system 63 which extends to the top of the casing section 36 and terminates in a sprocket wheel 64. The truck body 11 has a chamber divided off by a partition 65 to accommodate the drive system 63. The details of the system will not be gone into in that it consists merely of rotatively mounted shafts provided with bevel gears which mesh with each other. A sprocket chain 66 engages over the sprocket wheel 64 and over a sprocket wheel 67 upon a pintle shaft 68 which is mounted in blocks 69 upon the sides of the casing section 36. Rigid levers 70 project from the shaft 68 and are rigidly attached upon one of the sides of the casing section 37 so that upon turning of the shaft the casing section is moved to an opened position. Dot and dash lines 71 indicate the opened position of the casing and the dot and dash lines 70' indicate the moved position of the rigid levers 70.

The conveyor section 37' may also be operated automatically by suitable cables or wires connected near the driver's cabin 14.

The operation of the device may be traced by assuming it in the position as shown in full lines in Fig. 1. Refuse may be dumped into the inlet spout 38 and be fed up by the blades 47 of the conveyor. It is requisite that the conveyor work in an anticlockwise direction so that the blades scoop up material from within the bottom of the casing section 37, lift this material up and drop the material over into the top of the truck body 11. As the material piles up, the blades 37 will also serve to spread the material out towards the front of the truck body.

To empty the truck, the body 11 may be tilted upwards by the conventional controls. As the body tilts upwards, the gear 62 rides along on the stationary rack 60 so that it rotates and these rotations are transmitted by the system 63 to the sprocket 64. The motion continues from the sprocket to the sprocket 67 and the shaft 68. As the shaft 68 turns, the lever 70 will cause the casing section 37 to tilt away from the body 11 of the truck so that the rear may be opened for the dumping.

While I have shown and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. In a refuse truck, the combination of a truck body, means for tilting the body to dump from the rear, a loading conveyor extending across the top and rear side of said body, rack teeth upon said truck and means upon said truck body and engaging said rack teeth for automatically moving the conveyor section on the rear of the body away from the rear to allow dumping, comprising a stationary rack with a center of curvature corresponding with the pivot point of the truck body, a pinion in mesh with said rack, and a transmission system connected with said pinion and terminating in a sprocket wheel connected with a chain engaged over another sprocket upon a pintle shaft pivotally supporting the rear portion of said loading conveyor, and levers connected with said pintle shaft and said rear section for moving the rear section away from the rear of the body of the truck upon tilting of said body.

2. In a refuse truck, the combination of a truck body, means for tilting the body to dump the rear, a loading conveyor extending across the top and rear side of said body, rack teeth upon said truck, and means upon said truck body and engaging said rack teeth for automatically moving the conveyor section on the rear of the body away from the rear to allow dumping, comprising a stationary rack with a center of curvature corresponding with the pivot point of the truck body, a pinion in mesh with said rack, and a transmission system connected with said pinion and terminating in a sprocket wheel connected with a chain engaged over another sprocket upon a pintle shaft pivotally supporting the rear portion of said loading conveyor, and levers connected with said pintle shaft and said rear section for moving the rear section away from the rear of the body of the truck upon tilting of said body, said transmission system comprising a plurality of shafts connected with each other by bevel gears.

3. In a refuse truck, the combination of a truck body, means for tilting the body to dump from the rear, a door closing the rear of said body, a loading conveyor extending across the top and rear side of said body, and means for automatically moving the conveyor section on the rear of the body away from the rear upon tilting of the body to allow dumping, comprising a shaft pivotally mounted on the rear of said truck body and supporting the rear portion of the loading conveyor, levers connected with said shaft and a rear section of a casing covering the conveyor and means for revolving said shaft upon tilting of the said body, comprising a stationary rack with a center of curvature corresponding with the pivot point of the truck, a pinion mounted on the truck body and in engagement with said rack, and transmission means between said pinion and said shaft for transmitting rotations of the pinion.

4. In a refuse truck, the combination of a truck body, means for tilting the body to dump from the rear, a loading conveyor extending across the top and rear side of said body, rack teeth upon a stationary portion of said truck, and means for automatically moving the conveyor section on the rear of the body away from the rear upon tilting of the body to allow dumping, including means upon said truck body engaging said rack teeth.

5. A refuse truck, comprising a truck body having an open rear end and adapted to tilt to dump from the rear end, a hinged cover, extending over said open rear end for closing the same, a loading conveyor mounted on said cover, said loading conveyor continuing over the top of said truck body for loading same, the rear portion of said conveyor being pivoted relative to the top portion, and means for pivoting said rear conveyor section together with the hinged cover, away from the rear open end of the truck body, and at the lower end at the rear of said truck the loading conveyor is provided with a loading boot, having a section resiliently supported to be capable of moving out of position in the event of over-loading of the conveyor, a plurality of conveying blades or buckets projecting from said conveyor, means for moving the conveyor blades so that they scoop the refuse in said boot upward at the side adjacent the said hinged door, then dumping the refuse from the top of the refuse truck at its rear end first and as the refuse fills up the rear end of the truck body, the moving conveying blades or buckets act as scrapers to level the loaded refuse below the top of the truck body and thereafter to carry the excess refuse toward the front adjacent the levelled surface.

JOSEPH GOODMAN.